United States Patent
Braun et al.

(10) Patent No.: US 9,495,112 B1
(45) Date of Patent: Nov. 15, 2016

(54) SERVICE LEVEL BASED DATA STORAGE

(71) Applicant: EMC Corporation, Hopkinton, MA (US)

(72) Inventors: Robin C. Braun, Hollis, NH (US); Adnan Sahin, Needham, MA (US); Fidelma Russo, Sudbury, MA (US); Greg Findlen, Hopkinton, MA (US); Sonny Zhao, Waltham, MA (US); Kate Gladziszewski, Boston, MA (US); Marion Lally, Canton, MA (US)

(73) Assignee: EMC Corporation, Hopkinton, MA (US)

( * ) Notice: Subject to any disclaimer, the term of this patent is extended or adjusted under 35 U.S.C. 154(b) by 293 days.

(21) Appl. No.: 13/834,695

(22) Filed: Mar. 15, 2013

(51) Int. Cl.
G06F 3/06 (2006.01)

(52) U.S. Cl.
CPC ........... *G06F 3/0631* (2013.01); *G06F 3/0644* (2013.01); *G06F 3/0605* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 2006/0136437 A1* | 6/2006 | Yamasaki | 707/100 |
| 2008/0077682 A1* | 3/2008 | Nair | G06F 17/30115 709/223 |
| 2008/0126734 A1* | 5/2008 | Murase | G06F 3/0613 711/170 |
| 2010/0250748 A1* | 9/2010 | Sivasubramanian et al. | 709/226 |
| 2011/0302386 A1* | 12/2011 | Arakawa | 711/170 |
| 2012/0066337 A1* | 3/2012 | Wu | G06F 3/0605 709/214 |
| 2013/0080703 A1* | 3/2013 | Kumagai et al. | 711/117 |

OTHER PUBLICATIONS brunodom. "Scale-out storage—Thinking Outside of the Box." Published Dec. 27, 2011. <https://communities.intel.com/community/itpeernetwork/datastack/blog/2011/12/27/scale-out-storage-thinking-outside-of-the-box>.*
Burgess. Mark. "Fast VP tier sizing." Published Nov. 29, 2011. <https://community.emc.com/thread/128811>.*
Massiglia, Paul. "Exploiting multi-tier file storage effectively." Published in 2009. <http://www.snia.org/sites/default/education/tutorials/2009/spring/file/PaulMassiglia_Exploiting_Multi-Tier_File_StorageV05.pdf>. Note: PDF is protected and is not provided with this notice. Please refer to the URL above.*
Amazon. "AWS Free Usage Tier. " Published Mar. 7, 2012. <http://web.archive.org/web/20120307142051/http://aws.amazon.com/free/>.*

(Continued)

*Primary Examiner* — Charles Rones
*Assistant Examiner* — Hewy Li
(74) *Attorney, Agent, or Firm* — Anderson Gorecki & Rouille LLP

(57) ABSTRACT

The data storage capacity of a storage array, data center or networked data storage system is managed and allocated in terms of chunks of capacity at different service levels, where each service level is defined based on one or more of tiered storage policy settings, drive size, drive speed, drive count, RAID protection, engine fractions, bandwidth and availability and characterized by one or more performance capabilities, e.g., IOs per second. The physical storage devices at each service level may have similar capabilities or be tiered arrangements of devices having different capabilities. A request for storage indicates number of chunks and service level required, thereby avoiding typical allocation complexity. Monitoring and billing logic enables procurement on a per chunk basis at each service level, thereby optionally decoupling the cost of additional units of storage from underlying resources from the perspective of a customer.

29 Claims, 8 Drawing Sheets

(56) References Cited

OTHER PUBLICATIONS

Amazon. "What can I say? Another Amazon S3 price reduction". Published Nov. 1, 2010. <http://aws.amazon.com/blogs/aws/what-can-i-say-another-amazon-s3-price-reduction/>.*
Vasudeva, Anil. "Solid State Storage: Key to Efficient Tiered Storage Infrastructure." Published in 2011.*
SearchStorage. "Creating storage tiers for backup services". Published May 12, 2006. <http://searchstorage.techtarget.com/magazineContent/Creating-storage-tiers-for-backup-services>.*
Pinola, Melanie. "Dropbox vs. The Alternatives: Which Online Syncing Service is Right for You?". Published Jul. 7, 2011. <http://lifehacker.com/5818908/dropbox-vs-the-alternatives-which-online-syncing-service-is-right-for-you>.*
Massiglia, Paul. "Exploiting Multi-Tier File Storage Effectively". Published in 2009. Slides 5-31 provided. <http://www.snia.org/sites/default/education/tutorials/2009/spring/file/PaulMassiglia_Exploiting_Multi-TierFile_StorageV05.pdf>.*
Best Practices for SAS on EMC Symmetrix VMAX Storage, Technical Paper, 14 pages.
EMC Symmetrix VMAXe Storage System, Specification Sheet, 4 pages.
EMC Symmetrix VMAX 20K Storage System, Specification Sheet, 5 pages.

* cited by examiner

| Service Level | Chunk | Location | Owner |
|---|---|---|---|
| Gold | 1 | <cyl:Trk> | |
| . | . | . | |
| . | . | . | |
| . | . | . | |
| Silver | | | |
| . | | | |
| . | | | |
| . | | | |
| Bronze | | | |

*Figure 4*

SERVICE LEVEL BASED DATA STORAGE

CROSS-REFERENCE TO RELATED APPLICATIONS

NA

BACKGROUND OF THE INVENTION

The invention is generally related to electronic data storage systems which are associated with a network. Enterprise data storage systems are used to maintain relatively large data sets. A simple data storage subsystem includes a storage array and a host device. Applications Read and Write data by sending IO requests to the host device via the network. The host device translates the IO requests from a format characterized by designators used by applications, e.g., filename, into a format characterized by designators used by the storage array, e.g., LUN, cylinder and track, in order to prompt a Read or Write in accordance with the IO request. Clusters of hosts and storage arrays can be organized into a data center. Groups of data centers can be organized into a single data storage system.

Large data storage systems are relatively costly and complex. The performance of a data storage system is determined in part by the performance of individual devices. The performance of a storage array is a function of configuration details including the types of physical storage devices with which it is equipped. Typically, slower storage devices are less costly than faster devices so there is a tradeoff between storage capacity and performance. The performance of a host is dependent on such variables as processor performance and loading so increased performance is generally associated with increased cost. Host performance is also dependent on the underlying performance of the storage. Storage system performance is also affected by network performance, with higher performance links being more costly. Because of the relationship between performance and cost it is common practice to match storage system performance to anticipated performance requirements so as to avoid purchase of unnecessary storage resources. However, this is a complex task because different applications have different performance and capacity requirements, and those requirements may change over time. Further complicating matters, the costs associated with an additional unit of storage capacity are variable. For example, there may be no additional cost for an enterprise to utilize an additional unit of unused storage capacity, but adding a new unit of storage capacity may require upgrade of devices or even purchase of additional devices.

SUMMARY OF THE INVENTION

In accordance with an aspect an apparatus comprises: a data storage array having a plurality of physical data storage devices which define a data storage capacity of the storage array, the data storage devices including at least first and second storage devices characterized by different performance metrics; a data record which associates chunks of the data storage capacity of a predetermined size with ones of the physical storage devices, and which indicates a service level for the chunks, wherein there are multiple service levels and each service level is indicative of a level of performance; and logic for allocating chunks of data storage capacity at each service level.

In accordance with an aspect, a method comprises: in a data storage array having a plurality of physical data storage devices which define a data storage capacity of the storage array, the data storage devices including at least first and second storage devices characterized by different performance metrics, associating chunks of the data storage capacity of a predetermined size with ones of the physical storage devices, associating each chunk with a service level of a plurality of service levels indicative of different levels of performance, and allocating chunks of data storage capacity at each service level.

In accordance with another aspect a method comprises: receiving a request for data storage in a data storage subsystem, the request indicating an amount of data storage and a service level; and in response to the request, allocating data storage resources in the requested amount at the requested service level from at least one of a plurality of physical data storage devices which define a data storage capacity of a storage array associated with the data storage subsystem, the data storage devices including at least first and second storage devices characterized by different performance metrics and supporting different service levels.

In accordance with another aspect, a computer program stored on non-transitory computer-readable memory comprises: in a data storage array having a plurality of physical data storage devices which define a data storage capacity of the storage array, the data storage devices including at least first and second storage devices characterized by different performance metrics, logic which associates chunks of the data storage capacity of a predetermined size with ones of the physical storage devices, logic which associates each chunk with a service level of a plurality of service levels indicative of different levels of performance, and logic which allocates chunks of data storage capacity at each service level.

Advantages associated with aspects of the invention include abstracting hardware and software components from the storage users or tenants by representing those components in the form of services and service levels. Service levels and services can be defined based on one or more factors including but not limited to tiered storage policy settings, drive size, drive speed, drive count, RAID protection, engine fractions, bandwidth and availability. The resulting service levels are differentiated from each other by different performance characteristics. The service levels can presented in terms of usable capacity at a level without exposing the underlying factors which define the service level. Moreover, the service levels can be defined so as to achieve a targeted outcome to support known types of requirements. By abstracting storage in this manner the user can request additional storage in terms of capacity and service level rather than specifying particular components. Further, the user can scale the storage system via capacity units such as "chunks" (an amount of storage) or disk packs (hardware and software required to provide a level a service). The service levels can then be automatically provisioned by the tenant/sub-tenant based on capacity units and service levels rather than specific components.

Another advantage associated with aspects of the invention is simplification of matching storage requirements to storage capabilities and allocation of corresponding storage resources. Traditional procedures for allocating storage resources require skilled personnel to match application requirements with storage capabilities and reconfigure storage devices. These procedures are complex, error-prone, and costly. Further, they may be frequently utilized, e.g., when application requirements change or when a new application is provisioned or when an application moves between host servers in a cloud environment. Aspects of the invention help to overcome these problems because storage is organized in chunks or packs based on service levels. Consequently, storage requirements can simply be matched to a service level and available chunks or packs allocated accordingly. More particularly, it is not necessary to have knowledge of the performance of specific devices in the storage array in order to match and allocate storage resources to application requirements.

Another advantage associated with aspects of the invention is linearization of upgrades from the perspective of an owner or operator of a data storage system. For example, a manufacturer or distributor may sell a data storage system to an enterprise based on a cost per unit of capacity (chunk) at each service level. However, the data storage system may actually be provisioned with more resources than reflected by the selling price. The unsold storage resources are then available for use at a cost per chunk based on service level when needed. Various types of monitoring and reporting techniques can be used to indicate when the additional storage capacity is utilized in order to trigger billing if billing is based on utilization. Moreover, when all available storage capacity at a given service level has been utilized the manufacturer or distributor may upgrade the data storage system by adding another frame behind the same automation engine so that the customer continues to scale by adding disk packs or chunks. This starts to break down the construct of the array boundary, scaling out across cabinets and across frames without changing price or what the customer orders.

Other features and advantages will become apparent in view of the detailed description and figures.

BRIEF DESCRIPTION OF THE FIGURES

FIG. 4 illustrates a data record for supporting service levels.

DETAILED DESCRIPTION

Some aspects of the invention may be partially or wholly implemented in one or more computer programs. The computer programs are stored on non-transitory computer-readable memory and implement processes which may be defined by steps when utilized by general processor, specialized processor, or combination of processing devices.

Figure 1:
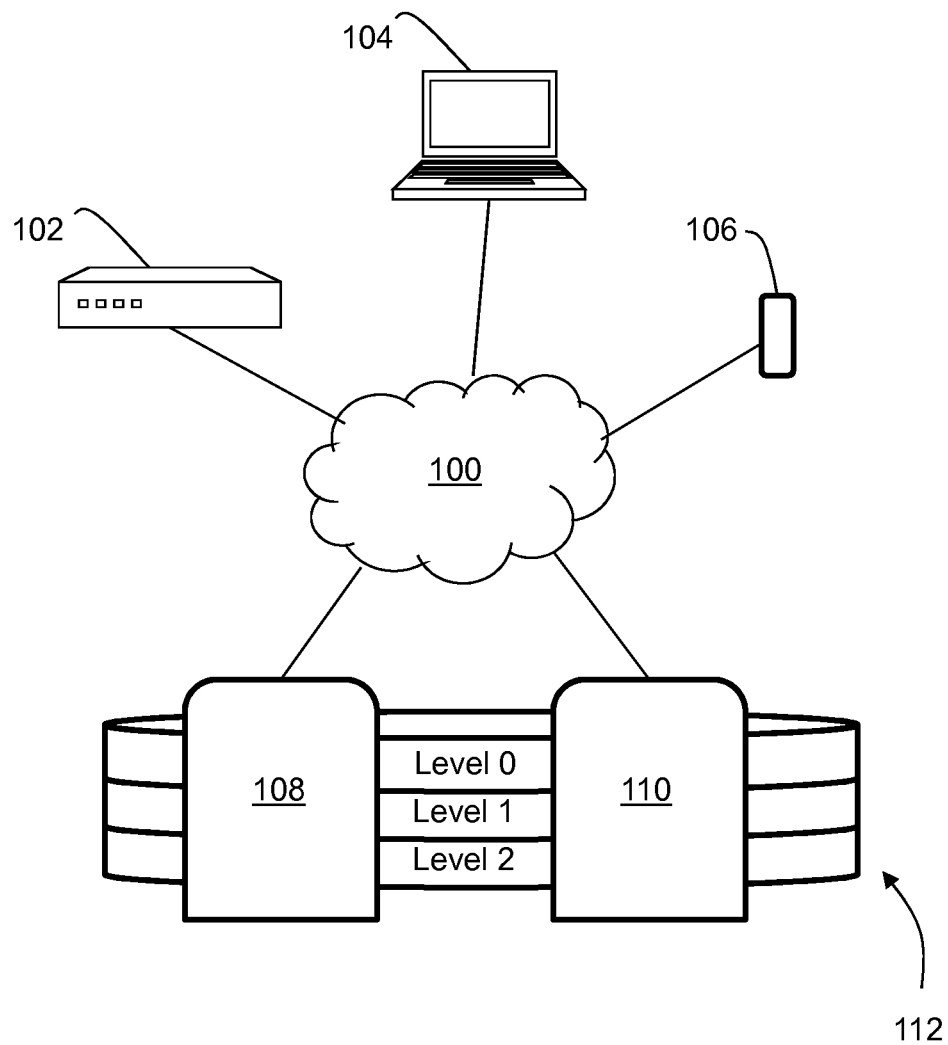
FIG. 1 illustrates a "cloud" environment in which various computing devices utilize a data storage system via a network.

FIG. 1 illustrates a "cloud" environment in which various computing devices utilize a data storage system via a network 100. The computing devices may include, for example and without limitation, servers 102, personal computers 104 and handheld mobile devices 106. The data storage system may include, for example and without limitation, data centers 108, 110. The data centers may be configured such that storage resources associated with the different data centers are presented and utilized as a single logical set 112 of storage resources from the perspective of the computing devices. Moreover, the logical set of storage resources is organized and managed based on service levels (Levels 0 through 2 in the illustrated example), where each service level is indicative of a particular level of performance. For example, each service level might be characterized by a minimum level or range of performance measured in terms of IO operations per unit time that can be performed, e.g., Level 0 being characterized by best performance in terms of IOs per second, Level 2 being characterized by lowest performance in terms of IOs per second, and Level 1 being characterized by performance between that of Level 0 and Level 2 in terms of IOs per second. Other differentiators which could be associated with service levels include but are not limited to media type (e.g., flash, phase-change memory (PCM), magnetic, etc.), rotational speed (e.g., 15K rpm, 10K rpm, 7.2K rpm, 5.4K rpm, etc.) and data protection e.g., (RAID-1, RAIDS, RAID-6, erasure coding, etc.). An authorized user or storage manager can allocate and de-allocate chunks of storage resources of a predetermined size at a particular level to an entity, where the entity may be an application, type of application, user, type of user, user group, device, type of device, or any other identifiable consumer of storage resources.

Figure 2:
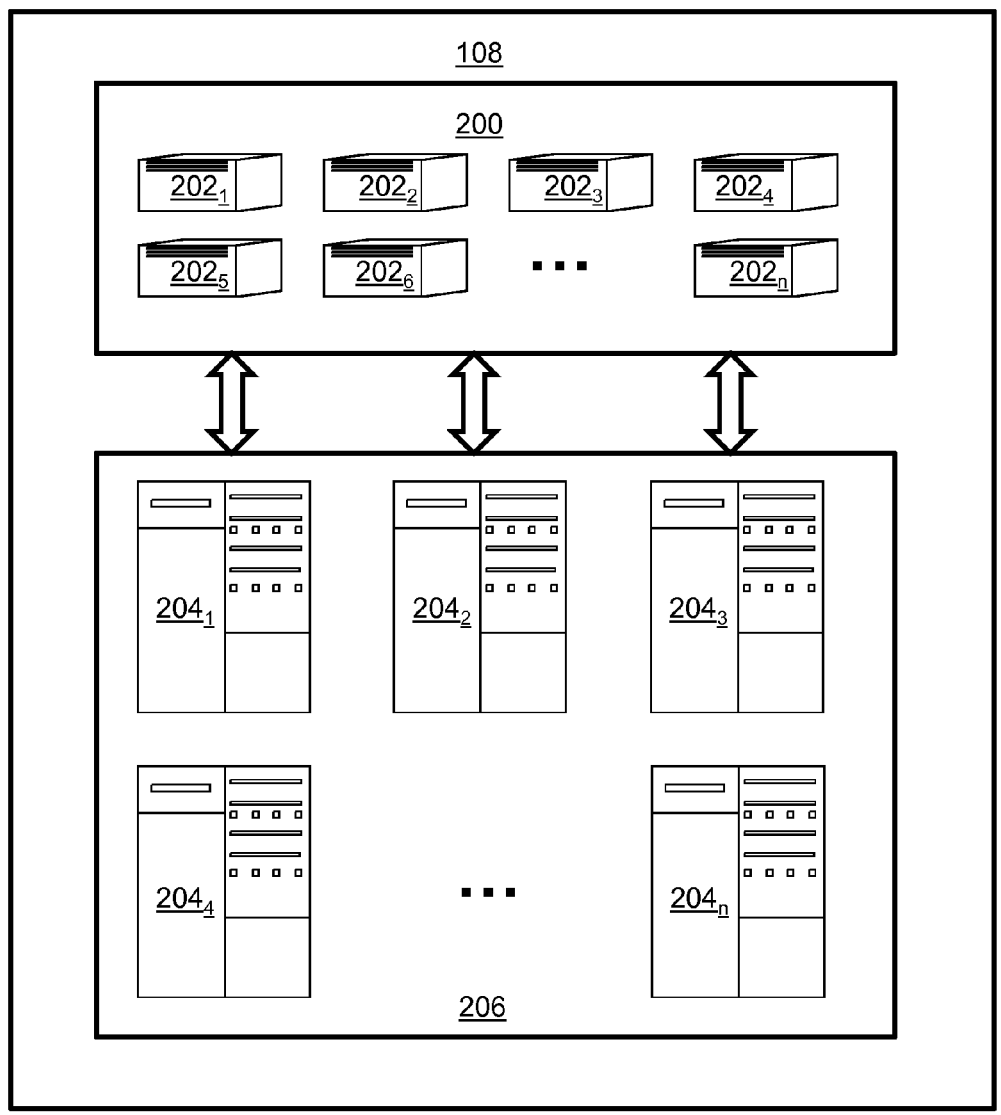
FIG. 2 illustrates a data center in greater detail.

FIG. 2 illustrates a data center in greater detail. Data center 108, for example, includes at least one cluster 200 of physical server devices 202$_1$ through 202$_n$ (hosts) and at least one cluster 206 of one or more data storage arrays 204$_1$ through 204$_n$. The hosts and data storage arrays are typically in communication via high bandwidth links. In general, the data storage arrays respond to IO requests from the hosts. Each host may support multiple instances of virtual hosts (virtual machines), and the data center is configured to selectively enable any virtual machine to utilize the storage resources of any storage array.

Figure 3A:
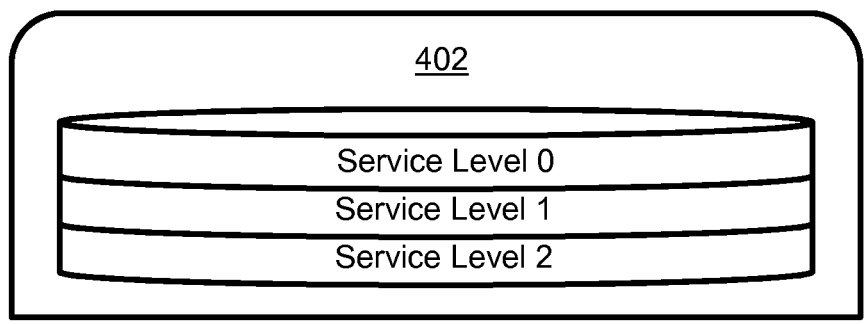
FIG. 3A illustrates service level based storage in a single data center.
Figure 3B:
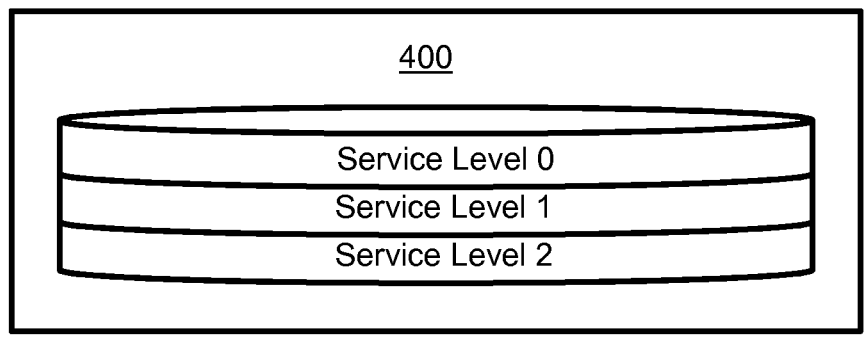
FIG. 3B illustrates service level based storage in a storage array.

Referring to FIGS. 1, 3A and 3B, in accordance with one aspect the logical volumes, physical storage devices, or both are organized based on service levels for a single storage array 400 (see FIG. 3B), a single data center 402 (see FIG. 3A), or a multi-datacenter data storage system (see FIG. 1). The requirements of applications and capabilities of storage devices are not generally available in a set of common metrics. For example, a Microsoft Exchange server for 1000 users might require 1000 IO/sec, 5 ms response time, for 70% Read and 30% Write, IO size 32 kb, and with 75% Read-miss ratio. These requirements might be satisfied with, e.g., 20 spindles FC, 10% of data in flash, 4 ports, 20 GB cache, and RAID level 6. However, matching requirements to capabilities requires specialized knowledge, and allocating the resources can be complicated. Service level based data storage helps to mitigate these problems. The service levels (Level 0 through Level 2 in the illustrated example) are indicative of a particular level of performance, e.g., as measured at ports of the storage array, host or other designated point. Moreover, each service level might be characterized by a minimum level or range of performance measured in terms of IO operations per unit time that can be performed by the storage array or data center, e.g., Level 0 being characterized by best performance in terms of IOs per second, Level 2 being characterized by lowest performance in terms of IOs per second, and Level 1 being characterized by performance between that of Level 0 and Level 2 in terms of IOs per second. Service levels may also be characterized by response time, Read:Write ratio, IO size and other metrics.

In order to implement service levels on the level of a storage array or data center, physical storage devices of identical or similar performance capability of storage array $204_n$ may be organized into pools $310_1$ through $210_n$, each of which is associated with a particular service level. However, any particular engine might be associated with storage devices of a single service level or multiple service levels. In other words, the set of devices associated with a particular service level need not be physically grouped together or even share the same engine. It follows that a logical volume maintained by the host might be associated with a single service level or multiple service levels, and pools of storage associated with a service level might be pools of logical or physical storage devices. The pools are a subcomponent of how the structure is created. Automated tiering technology such as Fast VP is used to unify separate pools, including moving the data between different physical levels of storage. The pools may leverage like drives together, or dedicated pieces of drives technically, and then data moves between the pools through automation on the array.

Referring to FIG. 4, a data record is maintained to support the service levels. The data record, which may be maintained in a host, storage array, other device or multiple devices, may indicate service level, chunk, location, and an entity (if any) to which the storage is allocated. The service levels may indicate absolute or relative performance in terms of one or more metrics. For example, storage resources could be divided into m service levels where each service level indicates a particular number of IOs per unit time that can be performed, or simply that performance is better than lower service levels and not as good as higher service levels. The service levels may be named in accordance with any convention, e.g. and without limitation, numbers 0 through x, gold, silver and bronze, 100 IO/sec, 1000 IO/sec etc. As will be explained in greater detail below, the data storage capacity at each service level may be organized as chunks of a predetermined size. The storage resources can then be purchased and allocated on a per GB basis. The location indicated in the data record may be a location on a physical storage device or a corresponding location on a logical storage device, e.g., cylinder and track. Moreover, the location can be a range, and might span multiple devices. The owner entity, if any, may be an application, type of application, user, type of user, user group, device, type of device, or any other identifiable consumer of the storage resources.

Figure 5:
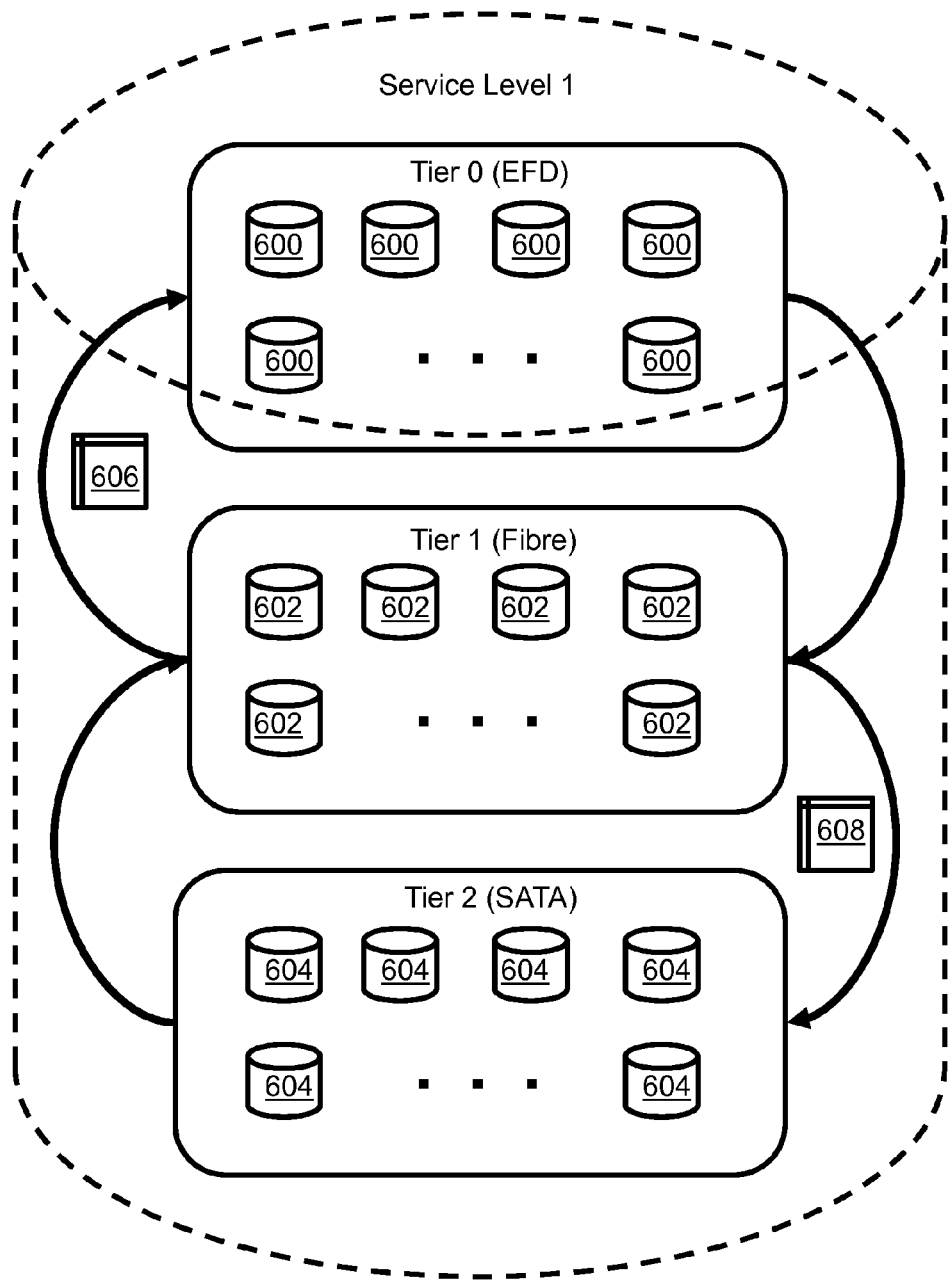
FIG. 5 illustrates implementation of a service level with tiered storage.

Referring now to FIG. 5, a service level (e.g., service level 1) may be implemented with tiered storage. In other words, a service level may be associated with physical storage devices of disparate performance characteristics. Each tier in a tiered storage arrangement is associated with physical storage devices of similar performance, and different tiers are characterized by different performance. For example, and without limitation, the physical storage devices may include high-speed flash (EFD) drives 600 at tier 0, Fibre Channel drives 602 at tier 1, and SATA drives 604 at tier 2, although any drive protocol types might be utilized to provide performance differentiation among drive types. Data 606, 608 is promoted to a higher tier or demoted to a lower tier (via copying or moving) based on anticipated future activity. One indicator of anticipated activity is recent activity, e.g., the more recently an extent was accessed indicates a greater likelihood of future activity. Various hinting techniques are known and will be developed for determining likelihood of anticipated activity of particular extents of data, and any techniques might be utilized. An advantage of implementing a service level with tiered storage is that performance at or near that of the highest tier can be achieved with a mix of physical storage devices, at least some of which may be less costly. For example, performance between that of Fibre and EFD might be achieved with a mix of EFD, Fibre and SATA arrays, which advantageously reduces the cost per unit of storage capacity relative to performance.

Referring to FIG. 1, while it is well known for multiple data centers to coordinate in support of disaster recovery operations, until recently the assets of different data centers were not integrated in a manner which supported normal operations. EMC VPLEX differs from such typical prior art systems because it enables federation of information across multiple data centers such that hosts and volumes located in different data centers function as if located in the same data center, at least from the perspective of a client application Further, such federation is practical even where the distance between the data centers is so great that synchronous Write IOs would result in un-acceptable delay because in at least some configurations the system has active/active asynchronous capability, e.g., a volume can be shared by two VMs located at different data centers at distances typically associated with asynchronous topologies. Thus, service level based storage can be implemented at the array or data center level as illustrated in FIGS. 3A and 3B, and at the multi-datacenter data storage system level as illustrated in FIG. 1.

Figure 6:
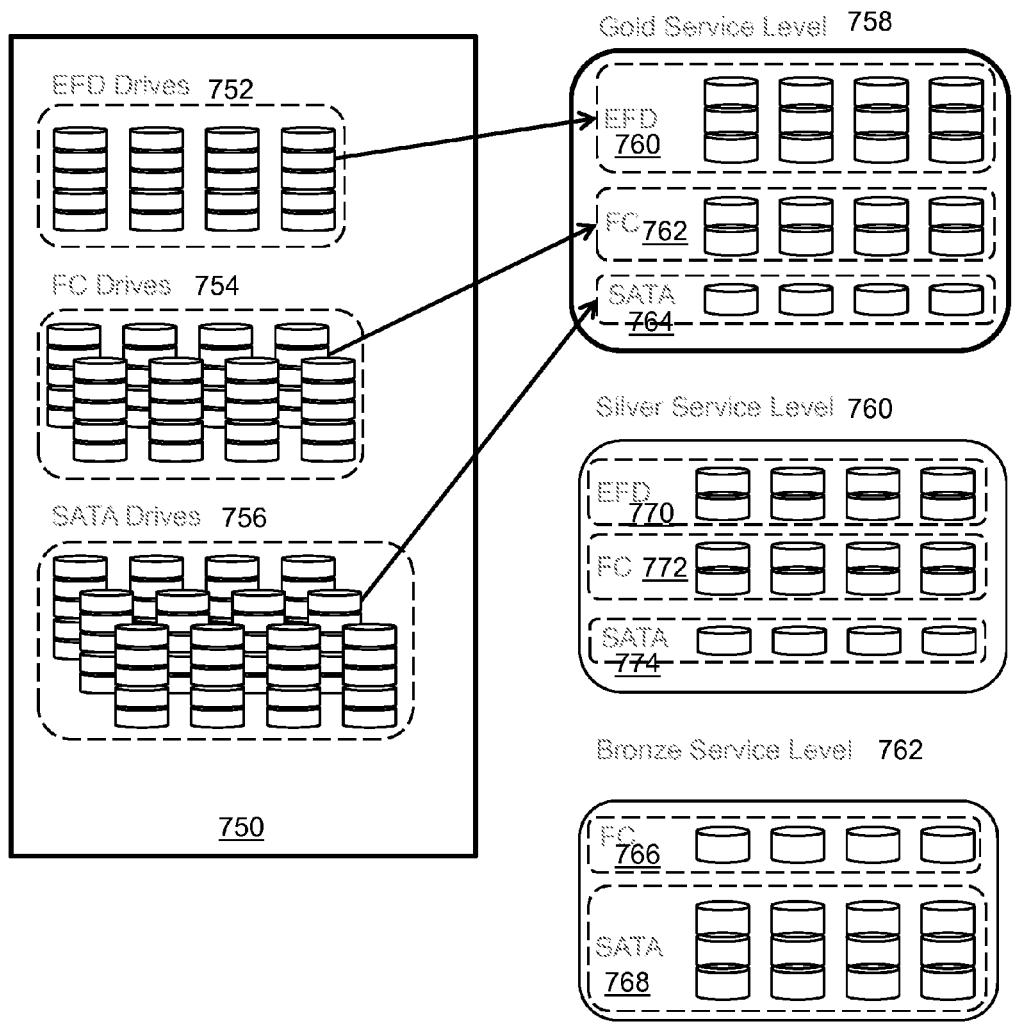
FIG. 6 illustrates distribution of storage resources for different service levels.

FIG. 6 distribution of storage resources for different service levels. A set of data storage resources 750 includes EFD drives, FC drives and SATA drives. The set of data storage resources 750 may be associated with a single storage array, single data center, multiple data centers, or any other device, part of a device, or group of devices. As shown in the illustrated example, the set of storage resources may include EFD drives 752, FC drives 754 and SATA drives 756, although this is not to be viewed as limiting in any way. Moreover, the set 750 includes relatively greater storage capacity on relatively lower cost, lower performance devices (e.g., SATA drives 756), and relatively lesser storage capacity on relatively higher cost, higher performance devices (e.g., EFD drives 752). Further, the overall available capacity associated with each type of device is not distributed equally at each service level, and some types of devices may not be used at particular service levels. The illustrated example includes, from higher performance to lower performance, a gold service level 758, a silver service level 760 and a bronze service level 762. Note that the gold service level 758 has an EFD pool 760, an FC pool 762 and a SATA pool 764, whereas the bronze service level 762 has only an FC pool 766 and a SATA pool 768 (no EFD pool). Note also that while the silver service level 760 has an EFD pool 770, an FC pool 772 and a SATA pool 774, the silver service level has less capacity in EFD pool 770 than the capacity of the gold service level EFD pool 760. A wide variety of types of devices and storage capacities could be used at various different levels depending on a desired cost, performance and other factors.

Figure 7:
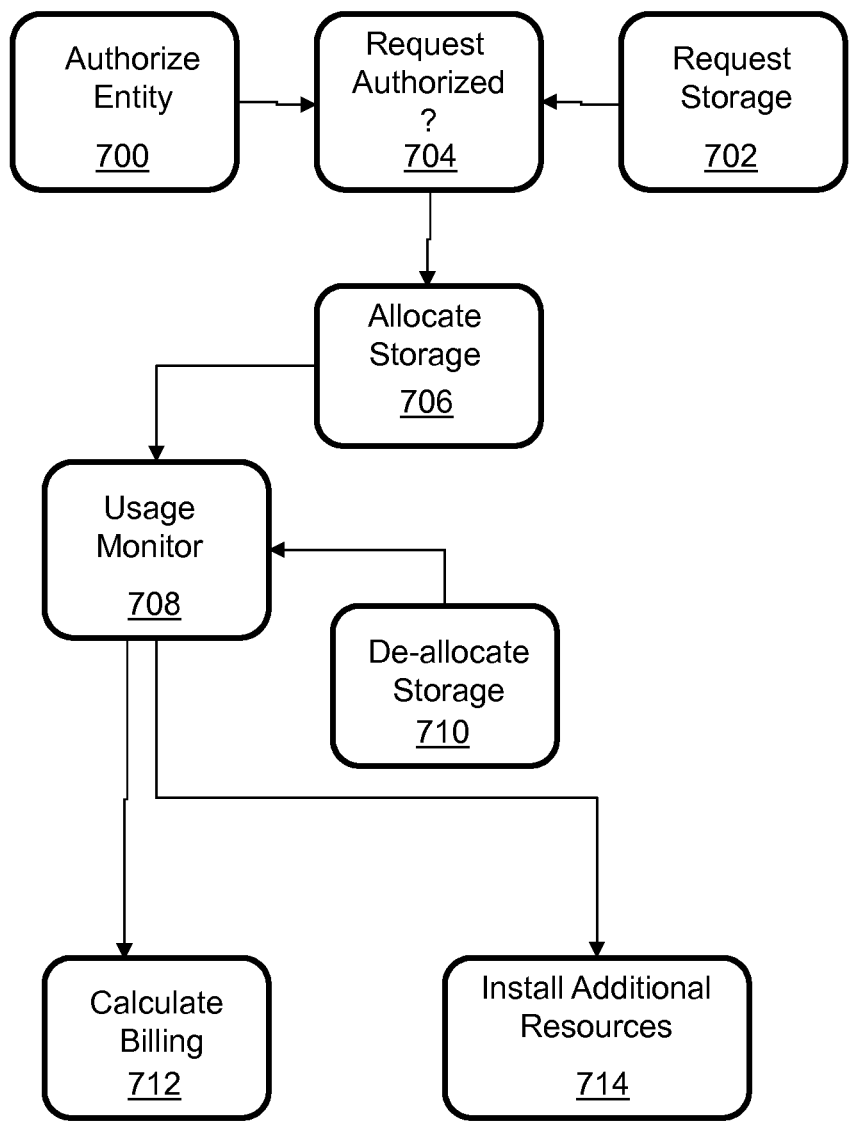
FIG. 7 illustrates a method of operating a data storage system.

FIG. 7 illustrates operation of service level based data storage. A storage manager or other operator authorizes entities to utilize a particular number of chunks of storage at one or more service levels in step 700. A request for storage resources is received at step 702. The request might indicate, for example, the requesting entity, service level and amount of storage required. It will be appreciated that matching application requirements to a service level is simpler than attempting to match application requirements to specific components and devices. Further, requesting storage at a particular service level is simpler than manually configuring components and devices. If the entity has been authorized for the requested storage as determined at step 704, the storage resources are allocated at step 706. In particular, one or more chunks of storage at a specified service level are allocated to the entity. The allocation is communicated to a usage monitor at 708. Storage can also be de-allocated at step 710 for a wide variety of reasons. De-allocation is also communicated to the usage monitor. Consequently, the usage monitor can determine an amount of storage (in chunks) allocated at each service level at any given time. This usage information can be used for IT showback tracking and optionally to calculate IT chargeback billing at step 712 and also to prompt installation of additional resources at step 714. A wide variety of billing models might be utilized. For example, billing could be based on a cost per GB or performance at each service level, or cost per chunk at each service level beyond a capacity base. It will be appreciated that billing on the basis of service level chunks tends to liberalize the costs of data storage system use from the perspective of a customer by transferring the non-linear cost to a seller. For example, a manufacturer or distributor may sell a data storage system to an enterprise based on a cost per chunk at each service level and provision the data storage system with more resources than are immediately anticipated to be required. Excess storage resources are then available for use at the cost per chunk when needed, e.g., as the customer's needs grow.

Figure 8:
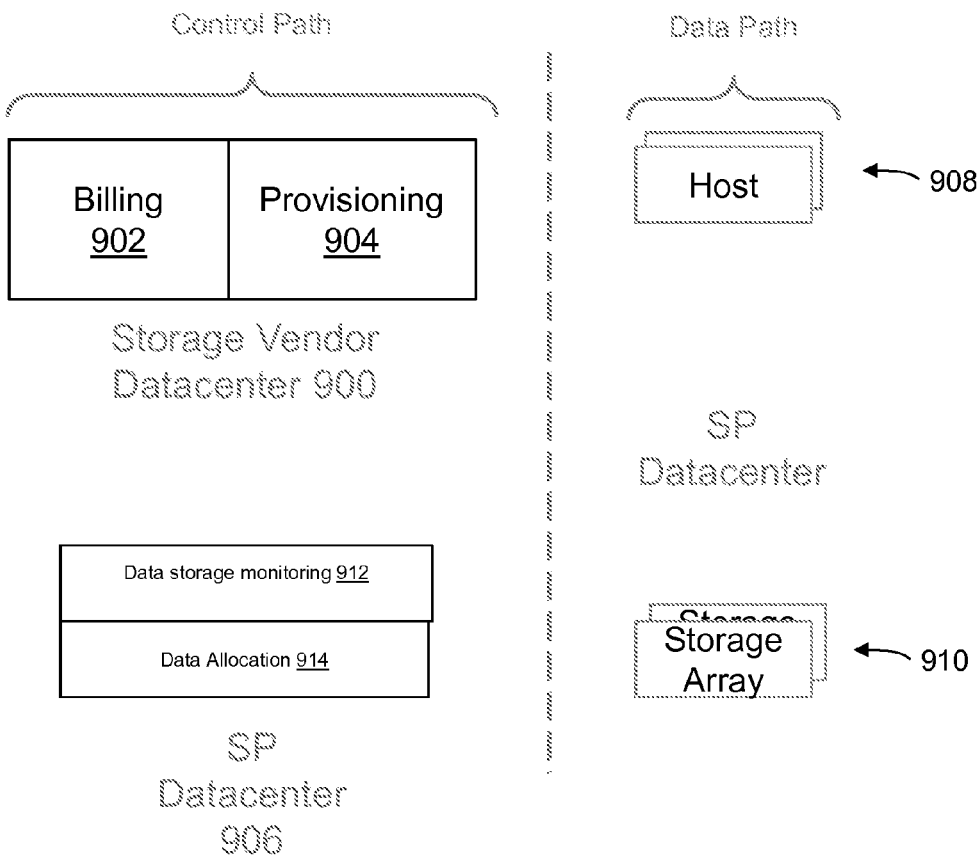
FIG. 8 is a block diagram of data storage system and management infrastructure.

FIG. 8 is a block diagram of data storage system and management infrastructure. A storage vendor datacenter 900 includes a billing function 902 and a provisioning function 904. A service provider data center 906 includes hosts 908, storage arrays 910, a data storage monitoring function 912 and a data allocation function 914. The hosts and storage arrays are part of a data path via which storage resources controlled by the service provider are utilized to support business operations (which may include reselling use of those resources). Functions in the control path manage operation of the data storage resources in the data path. For example, the data allocation function may include a record of which storage resources are associated with each service level, and to which entities chunks of those storage resources are currently allocated. The data storage monitoring function monitors actual use of the data storage resources at each service level and reports to the billing and provisioning functions. The billing function generates billing information based on storage resource usage using any of a wide variety of billing models. For example, and without limitation, the storage vendor might bill the service provider for the number of chunks utilized (e.g., max or average) during a predetermined time period. The provisioning function prompts the storage vendor to add more storage resources to the data path when usage approaches available capacity. Note that it is also possible that the storage arrays could be under the control of the storage vendor.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus comprising:
   a data storage system having a plurality of physical data storage devices which define a data storage capacity of the storage system, the data storage devices including at least first and second storage devices characterized by different performance metrics;
   a data record which associates chunks of the data storage capacity of a predetermined size with the physical storage devices, and which indicates a service level for the chunks, wherein there are multiple service levels and each service level is indicative of a level of performance;
   logic which presents chunks of unallocated data storage capacity at each service level for selection; and
   logic which allocates a selected number of the chunks of unallocated data storage capacity at a selected service level to a consumer of storage resources in response to a request for the selected number of chunks of data storage capacity at the selected service level.

2. The apparatus of claim 1 including a data center with logic which associates data storage capacity of multiple data storage arrays at a service level.

3. The apparatus of claim 2 including a data storage system with logic which associates data storage capacity of multiple data centers at the service level.

4. The apparatus of claim 1 wherein each service level is associated with physical storage devices characterized by a particular performance metric.

5. The apparatus of claim 1 wherein each service level is associated with tiered physical storage devices characterized by different performance metrics, and including logic for promoting data to a tier characterized by better performance in response to an indication of anticipated usage of the data.

6. The apparatus of claim 1 wherein each service level is defined based on one or more of tiered storage policy settings, drive type, drive size, drive speed, drive count, RAID protection, engine fractions, bandwidth and availability.

7. The apparatus of claim 1 including logic which de-allocates a number of the chunks of data storage capacity at a selected service level in response to a corresponding request.

8. The apparatus of claim 1 including logic which monitors allocation of storage capacity in terms of chunks allocated at each service level.

9. The apparatus of claim 8 including logic which generates billing information based on number of chunks allocated at each service level.

10. A method comprising:
    in a data storage system having a plurality of physical data storage devices which define a data storage capacity of the storage system, the data storage devices including at least first and second storage devices characterized by different performance metrics, associating chunks of the data storage capacity of a predetermined size with the physical storage devices, associating each chunk with a service level of a plurality of service levels indicative of different levels of performance, presenting chunks of unallocated data storage capacity at each service level for selection, and allocating a selected number of the unallocated chunks of data storage capacity at a selected service level to a consumer of storage resources in response to a request for the selected number of chunks of data storage capacity at the selected service level.

11. The method of claim 10 including associating data storage capacity of a service level of multiple data storage arrays.

12. The method of claim 11 including associating data storage capacity of a service level of multiple data centers.

13. The method of claim 10 including associating a service level with physical storage devices characterized by a particular performance metric.

14. The method of claim 10 including associating a service level with tiered physical storage devices characterized by different performance metrics, and promoting data to a tier characterized by better performance in response to an indication of anticipated usage of the data.

15. The method of claim 10 including defining each service level based on one or more of tiered storage policy settings, drive type, drive size, drive speed, drive count, RAID protection, engine fractions, bandwidth and availability.

16. The method of claim 10 including de-allocating a number of the chunks of data storage capacity in response to a corresponding request.

17. The method of claim 10 including monitoring allocation of storage capacity in terms of chunks allocated at each service level.

18. The method of claim 17 including generating billing information based on number of chunks allocated at each service level.

19. A method comprising:
presenting unallocated data storage capacity of a data storage system for selection at each service level of a plurality of service levels, wherein each service level is indicative of a level of performance;
receiving a request for data storage in the data storage system from a consumer of storage resources, the request indicating a selected amount of data storage and a selected service level; and
in response to the request, allocating data storage resources to the consumer of storage resources in the selected amount at the selected service level from at least one of a plurality of physical data storage devices which define a data storage capacity of the data storage system, the data storage devices including at least first and second storage devices characterized by different performance metrics and supporting different service levels.

20. The method of claim 19 including allocating a number of chunks of data storage of predetermined size in response to the request, the amount of data storage in the request indicating the number of chunks.

21. The method of claim 19 including generating billing data based on the amount of data storage allocated and the service level.

22. The method of claim 19 including generating billing data based on data storage performance and the service level.

23. The method of claim 21 including calculating a total cost based on a cost per chunk at the storage level where the cost of each chunk at the service level is the same.

24. The method of claim 19 including generating billing data based on the amount of data storage allocated and the service level only if an overall amount of data storage allocated at the service level exceeds a predetermined amount.

25. The method of claim 23 including calculating a total cost based on a cost per chunk at the service level.

26. The method of claim 22 including calculating a total cost based on a cost per performance per chunk.

27. The method of claim 19 including generating data indicative of unallocated storage capacity.

28. The method of claim 27 including installing additional physical storage devices in response to the data indicative of unallocated storage capacity.

29. A non-transitory computer-readable memory comprising a computer program, the computer program comprising:
in a data storage system having a plurality of physical data storage devices which define a data storage capacity of the storage system, the data storage devices including at least first and second storage devices characterized by different performance metrics, logic configured to associate chunks of the data storage capacity of a predetermined size with the physical storage devices, logic configured to associate each chunk with a service level of a plurality of service levels indicative of different levels of performance, logic which presents chunks of unallocated data storage capacity at each service level for selection, and logic configured to allocate a selected number of chunks of unallocated data storage capacity at a selected service level to a consumer of storage resources in response to a request for the selected number of chunks of data storage capacity at the selected service level.

* * * * *